United States Patent [19]

Shobert

[11] 3,870,589

[45] Mar. 11, 1975

[54] CARBON-FLUOROCARBON FIBER-PLASTIC COMPOSITE BEARING

[76] Inventor: Samuel M. Shobert, 17760 Dragoon Trail, Mishawaka, Ind. 46544

[22] Filed: July 20, 1973

[21] Appl. No.: 381,219

[52] U.S. Cl. ............ 161/47, 161/59, 161/60, 161/88, 161/92, 161/95, 161/139, 161/182, 161/189, 308/238, 308/DIG. 8
[51] Int. Cl. ............ F16c 13/02, F16c 37/00
[58] Field of Search ............ 161/47, 92, 93, 88, 89, 161/95, 189, 55, 60, 59, 139, 152, 156, 170, 182, 184, 231; 308/238, 173, DIG. 8

[56] References Cited
UNITED STATES PATENTS

| | | | |
|---|---|---|---|
| 3,131,979 | 5/1964 | Shobert | 308/238 |
| 3,458,374 | 7/1969 | Shobert | 161/189 |
| 3,533,668 | 10/1970 | Turis | 308/238 |
| 3,741,855 | 6/1973 | Harrison | 161/189 |

Primary Examiner—Marion E. McCamish

[57] ABSTRACT

A reinforced plastic composite bearing comprising a tubular layer of polytetrafluoroethylene threads imbedded in a resin material enrobed by a tracking of carbon fiber strands disposed in the same resin material in sufficient quantity as to provide a relatively strong and rigid bearing structure. The inner and outer peripheral surfaces include the fibers of both, respectively, polytetrafluoroethylene and carbon such that the bearing may have interior and exterior bearing surfaces of different bearing material.

11 Claims, 9 Drawing Figures

PATENTED MAR 11 1975  3,870,589

3,870,589

CARBON-FLUOROCARBON FIBER-PLASTIC COMPOSITE BEARING

BACKGROUND OF THE INVENTION

1. Field of the Invention

This invention relates to improvements in plastic composite bearings and more particularly to bearings which utilize fibers of fluorocarbon resin such as polytetrafluoroethylene as one lubricous material and fibers of carbon or graphite imbedded in the resin material as a backing therefor which may also serve as a second lubricous material.

2. Description of the Prior Art

Plastic composite bearings of laminar construction are known, utilizing polytetrafluoroethylene fibers to form the bearing surface and glass fibers as a backing therefor. See, for instance, Shobert U.S. Pat. Nos. 3,131,979, 3,560,065 and Shobert Application Ser. No. 306,295 filed Nov. 14, 1972. Such bearings include threads, cords or strands of such fibers imbedded in a hardened plastic such as polyester or epoxy. Shaft bearings of cylindrical shape have an interior bearing surface of polytetrafluoroethylene fibers and a circumferential rigid backing of glass fibers which contribute to the bearing's strength and rigidity.

Glass reinforcement in plastic bearings has been widely used thereby evidencing its suitability for the purpose. There are, however, certain disadvantages involved in the use of glass fiber as reinforcement. By comparison, glass fiber is relatively dense, of low thermal conductivity, has a high coefficient of friction and is quite flexible. As a consequence, glass fiber as reinforcement in a plastic bearing contributes appreciably to the weight of the bearing, low thermal conductivity, and high coefficient of friction upon penetration of such fibers into the bearing surface. Since glass fiber is flexible, a minimum quantity of this material is needed to assure adequate rigidity in the final product.

Being of high coefficient of friction, the exterior surface of the glass fiber-resin backing is totally unsuitable as a bearing surface thereby requiring the addition of a suitable bearing material if a bearing surface is required.

SUMMARY OF THE INVENTION

In accordance with the broader aspects of this invention, there is provided a low friction, plastic composite bearing comprising a body of self-supporting, hardened plastic having at least two contiguous laminations of fibrous material securely imbedded therein. One of the laminations has a bearing surface and includes fibers arranged in layer form of fluorocarbon resins secured in place by the plastic. Portions of these fibers are exposed through the plastic to define the bearing surface. The other lamination is a rigid backing for the one lamination and includes a mass of contiguous fibers in layer form of carbon or graphite secured in place by the aforesaid plastic. The layer formed by the carbon fibers is contiguous to the layer of fluorocarbon resin fibers thereby providing for thermal conductivity between the layers.

In one specific embodiment the body is cylindrically shaped having inner and outer peripheral surfaces, one of these surfaces including the fluorocarbon fibers and the other the carbon fibers, the bearing thus having two lubricous bearing surfaces.

It is an object of this invention to provide a plastic composite bearing having improved resistance to distortion or damage due to temperature changes, improved lubricity over a relatively long wearlife, and of relatively light weight for a given strength and rigidity.

Another object is to provide a plastic composite bearing of laminar construction utilizing a first lamination of polytetrafluoroethylene fibers to provide a first bearing surface and a second superposed lamination of carbon fibers to provide a second bearing surface, the carbon fibers being in sufficient quantity to contribute a desired degree of stiffness and strength to the bearing.

The above-mentioned and other features and objects of this invention and the manner of attaining them will become more apparent and the invention itself will be best understood by reference to the following description of an embodiment of the invention taken in conjunction with the accompanying drawings, wherein:

The present invention is not limited to bearings but has application to many different structures wherein bearing surfaces are required to reduce friction between engaged moving surfaces. Also, while the bearings disclosed herein are primarily cylindrical in shape, the principles of this invention may be employed in making other shapes. Generally speaking, the bearing of this invention is fabricated of essentially the same plastic and lubricous materials as are conventionally used in prior art devices as disclosed in the aforesaid Shobert patents, the lubricous material being in the form of polytetrafluoroethylene fiber strands uniquely arranged and combined with strands of carbon fibers as will be described in more detail hereinafter. This invention constitutes an improvement over the structures of the aforesaid Shobert patents, Shobert Application Ser. No. 306,295 and its divisions.

Figure 1:
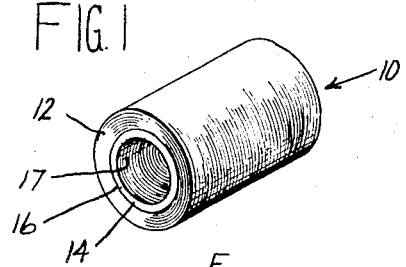
FIG. 1 is a perspective illustration of one bearing embodiment of this invention.
Figures 2, 3:
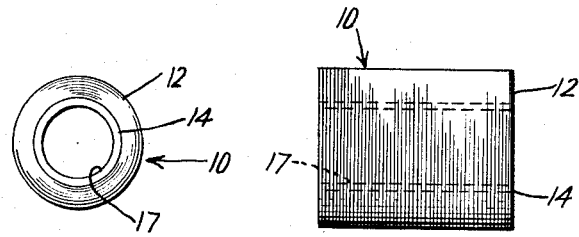
FIG. 2 is an end view thereof.
FIG. 3 is a side view.

As shown in FIGS. 1, 2, and 3, the cylindrical bearing indicated generally by the reference numeral 10 is composed of essentially two contiguous, coaxial, tubular laminations 12 and 14. In one embodiment of this invention, which will later be described with particularity in connection with FIGS. 7 and 8, the tubular lamination 14 is constructed primarily of polytetrafluoroethylene cords helically braided together, the basic constitutent being a strand of unbleached yarn which in a working embodiment of this invention has sixty filaments and a denier of four hundred, each strand preferably being twisted about eleven turns to the inch. Such a strand is presently marketed under the trademark TEFLON by E. I. DuPont DeNemours and Company, Inc. as further described in the aforesaid Application Ser. No. 306,295 filed Nov. 14, 1972. A plurality of these strands, in a working embodiment of this invention, is braided into a woven cord 15 (FIGS. 7 and 8) having an outer surface which is irregular in the sense that it has a multiplicity of longitudinally repeated raised and depressed portions as well as some porosity provided by interstices between fibers and the strands themselves. The cord structure will be explained in more detail.

Figure 6:
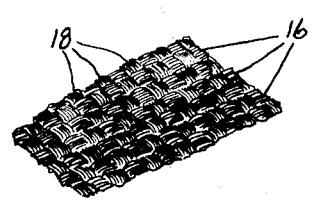
FIG. 6 is an enlarged view of a small area of the interleaved threads or strands in the bearing as woven by the apparatus of FIGS. 4 and 5.

The pattern of the braid forming lamination 14 is illustrated in FIG. 6 and is shown as comprising a plurality of cords 15 identified as 16 and 18, respectively, which are criss-cross in woven relationship with each of the cords 16 and 18 alternately passing over and under each other as shown. Each cord 16, 18 follows the form of a helix from one end of the bearing 10 to the other.

A second lamination 12 of helically wound threads or strands of carbon or graphite fiber coaxially and contiguously overlies lamination 14, these carbon threads being wound contiguously and in multiple circumferential layers to provide the cylindrical shape shown. Both of these laminations 12 and 14 are imbedded in epoxy or polyester resin; however, the inner peripheral surface 17 of the lamination 14 has exposed substantial portions of the pure polytetrafluoroethylene fibers which constitute the cords of the lamination 14.

The carbon threads or strands are conventional. Suitable strands are characterized as carbon tow, identified by the trademark "Fortafil 3-T", manufactured by Great Lakes Carbon Corp. Such strands are composed of a multiplicity of individual carbon fibers, which may be like those disclosed in U.S. Pat. No. 3,476,703, corresponding in appearance to conventional glass fiber roving, yarn and the like.

The two laminations 12 and 14 are intimately and rigidly held together by means of the polyester or epoxy resin described above.

Figure 4:
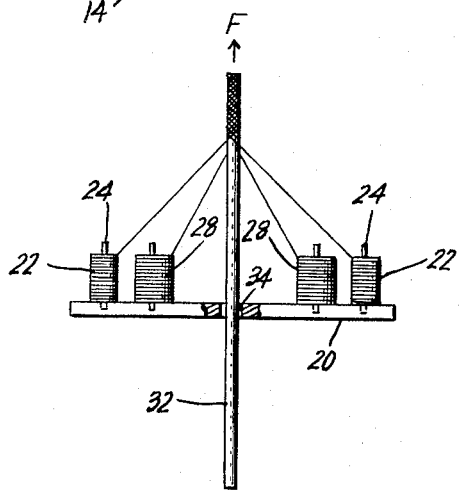
FIG. 4 is a diagrammatic illustration, partly in vertical section, of an apparatus used in the fabrication of this bearing.
Figure 5:
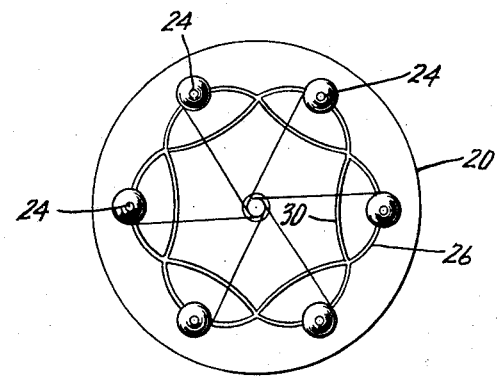
FIG. 5 is a top plan view in diagrammatic form of the apparatus of FIG. 4.

A method of fabricating the bearing will now be explained. Referring to FIGS. 4 and 5, a conventional braiding machine carries on its supporting table 20 a suitable number (six, in the present instance) of spools 22 and 28 of polytetrafluoroethylene cord 15. These spools 22 and 28 are supported on suitable spindles 24 which fit into undulating guide grooves 26 as shown in FIG. 5. There are two series of spools on table 20, the spools 22 being characterized as the outer spools while spools 28 are the inner spools. By reference to FIG. 5, it is clearly shown that there are two different undulating grooves 26 and 30 which cross over alternately, and the spools 22 and 28, respectively, ride in these grooves.

A mandrel 32, cylindrically shaped, is passed through a clearance opening 34 in table 20. An operator can hold this mandrel 32 in position and operate it in the proper manner, as will be explained.

Woven cords 15 of polytetrafluoroethylene from the respective spools 22 and 28 are individually affixed to the upper end of mandrel 32 by some suitable means such as by tying with a string or the like. This places the apparatus in readiness for operation.

In operation, mandrel 32 is slowly raised in the direction of the arrow F, while spools 22 and 28 are moved at a uniform rate of speed through the guiding grooves 26 and 30, respectively. With the spools 22 and 28 moving in opposite directions, a braid is woven on the surface of the mandrel 32 as the latter is continuously raised at a uniform rate until its length is entirely covered. The individual cords 15 are then cut and secured against loosening by adhesive tape or string tied tightly around the mandrel, thereby leaving the mandrel 32 with a braided layer of polytetrafluoroethylene cords. Preferably, the cords of the braid are laid contiguously thereby providing a woven fabric having a minimum of visible openings or pores therein. The denseness of the weave is controlled to suit design requirements, this control being effected by determining the speed at which the mandrel 32 is raised and the tension on the cords 16 and 18 as they pay off the spools 22 and 28.

As the next operation, the mandrel 32 with the layer 14 of polytetrafluoroethylene fabric has filament wound thereon from end to end and to a suitable radial thickness a layer 12 of carbon or graphite strand as previously described, the strand and fibers thereof being positioned as closely together as possible. One method and apparatus for winding the carbon strand onto the mandrel is taught in Shobert U.S. Pat. No. 3,281,299. In particular, the mandrel 32 with the fabric layer 14 thereon is mounted in a machine resembling a lathe and rotated about its axis. Mounted on the lathe (not shown) is a carriage having a driving connection with a conventional traversing screw all as shown in the aforesaid U.S. Pat. No. 3,281,299. This carriage carries an apertured guide member 29 which receives therethrough a resin-wetted strand 31 of carbon fibers drawn through a tank 33 of liquid, uncured polymeric resin 35 from a spool 37. Several such spools 37 may be used with all the strands thereof being collected together in the form of a bundle of suitable size which will conveniently pass through the eye of the guide member 29. More specifically, the strand or bundle payed off the spool 37 is passed over and under suitable smooth metallic bars 40 secured transversely in the tank 33, some of these bars 40 being submerged in the resin 35 so as to guide the strand 31 through the resin for thorough impregnation.

As explained in the aforesaid U.S. Pat. No. 3,281,299, operating the lathe causes rotation of the mandrel 32 causing the strand 31 to be wound thereon. The pitch of the traversing screw (not shown) as well as the rotation thereof are so adjusted as to lay the turns of the strand 31 contiguously helically on the mandrel 32 such that when the carriage traverses the entire length of the mandrel 32, a single helical layer of carbon strand will be applied thereto. Upon reaching the end, the traverse is reversed so as to lay a second helical layer of wetted bundle on top of the first layer, and this operation is repeated until a desired radial thickness of carbon strand is applied.

The resin in the strand 31 being liquid penetrates into the pores and interstices of the fabric and fibers of the lamination 14 such that all of the polytetrafluoroethylene and carbon fibers are imbedded in the resin. The mandrel 32 with its impregnated covering is removed from the lathe and the resin is then hardened by curing. If the resin used is polyester or epoxy, preferably the mandrel is placed in a heated curing mold or oven until it is completely cured and hardened.

The mandrel 32 is then removed from the resin-supported laminations 12, 14, the resultant product being a hollow self-supporting tube.

The carbon strand 31 may be applied to the mandrel 32 in dry form, and the mandrel thereafter immersed in a tank containing liquid resin for a sufficient period of time to insure impregnation. Also, the mandrel with only lamination 14 thereon may be immersed prior to application of the lamination 12. It is important that the impregnation be thorough and that no voids or air pockets exist within the structure. The hardened composite tube removed from the mandrel 32, if too long, can be cut into shorter lengths so as to obtain the size bearings depicted in FIGS. 1 through 3.

Figure 7:
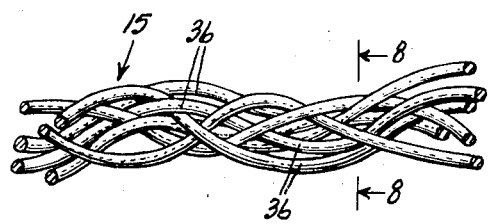
FIG. 7 is a view of a short length of woven cord used in one embodiment of this invention.
Figure 8:
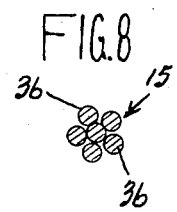
FIG. 8 is cross-section taken substantially along section line 8—8 of FIG. 7.

The structure of the cord 15 of FIGS. 7 and 8 will now be described. Strands of polytetrafluoroethylene yarn of, for example, 400 denier, 60 filaments or fibers twisted eleven turns to the inch are braided together relatively tightly as shown in FIG. 7, these individual strands being indicated by numeral 36. In a particular embodiment, six strands 36 are used. These strands are braided together to form a cord, using the apparatus of FIGS. 4 and 5.

While the cord 15 is the preferred constituent of the woven fabric 14, this invention is not limited thereto, as the lamination 14 may be formed of other polytetrafluoroethylene fiber fabric designs, including the one of Shobert U.S. Pat. No. 3,131,979.

As regards the design of the lamination 14, the disclosure of the aforesaid application Ser. No. 306,295 filed Nov. 14, 1972 is incorporated herein by reference.

Figure 9:
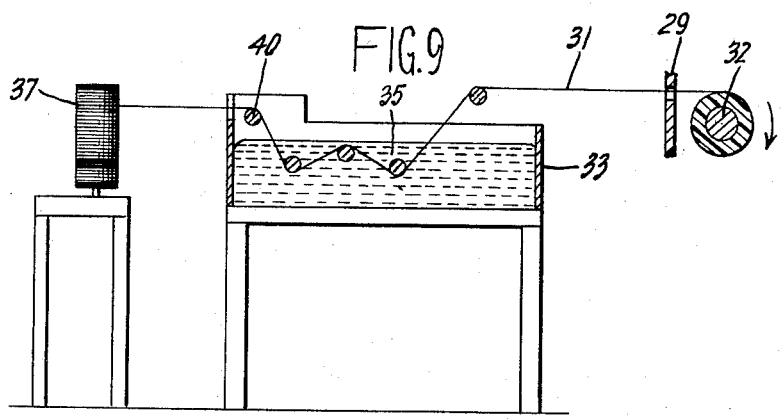
FIG. 9 is a side view, partly sectioned, of an apparatus used in applying the carbon fibers during bearing fabrication.

Inasmuch as the material of the strand 31 (FIG. 9) which may be carbon in the form of graphite, is itself a lubricous material, the hardened plastic composite tube stripped from the mandrel 32 may have its outer surface concentrically ground such that it is truly coaxial relative to the inner peripheral surface. Thus ground, the resultant product is a bearing having inner and outer concentric bearing surfaces, the inner bearing surface being provided by the polytetrafluoroethylene and the outer surface by the carbon or graphite exposed through the plastic. In one working embodiment of this invention, the radial thickness of the carbon lamination is about one sixteenth inch and the thickness of the layer 14 about one-half or a third of that for a bearing having an outer diameter of about seven-eighths inch.

In another embodiment of this invention, carbon fibers are intermingled with the polytetrafluoroethylene fibers such that the inner bearing surface is a composite of both. This may be accomplished by using a carbon strand or tow as one of the strands 36 in the cord 15. The carbon diluent by reason of its thermal conductivity aids in dissipating the heat of friction thereby minimizing the heating of the polytetrafluoroethylene fibers which cannot withstand as high temperatures as the carbon. Also, the strength of the bearing layer 14 is enhanced and the lubricity maintained.

The carbon or graphite strand 31 has properties of low coefficient of friction, high resistance to wear and corrosion, low density, a relatively high degree of stiffness and strength, high resistance to distortion due to changes in temperature and a relatively high degree of thermal conductivity. In the bearing of this invention, utilization of such carbon fibers as reinforcement for the backing of the inner bearing layer makes possible the achievement of a bearing of lighter weight for a given strength as compared to a glass-reinforced plastic bearing. Since carbon fibers are more stiff than corresponding fibers of glass, the finished bearing will have a greater degree of rigidity and strength for a given radial thickness of backing (12) than would be true if glass fiber were used. Since the carbon material is in intimate contact with the bearing layer 14, heat generated at the inner bearing surface will be rapidly conducted away by reason of the greater thermal conductivity of the carbon so as to maintain the bearing surface relatively cool as well as the resin material which secures the fibers in place. This is an important design consideration in the fabrication and use of plastic bearings of the type herein disclosed inasmuch as such bearings characteristically are subject to damage and deterioration when subjected to some heavy duty uses. Further improvement is realized in the bearing's high resistance to distortion due to temperature changes which, when combined with the relative stiffness of the carbon fibers, yields a bearing of lighter weight which is capable of maintaining dimensional stability over a wider range of dynamic conditions.

Lubricity is maintained over a longer period of wear-life inasmuch as any wearing through of any of the polytetrafluoroethylene material results in exposure of the carbon fibers which are also lubricous. Shafts journalled in such bearings are thus less likely to be damaged due to excessive bearing wear thereby providing an economy in the longer life of the shaft.

The carbon material can withstand appreciably higher temperatures than can the polytetrafluoroethylene. If the bearing having a carbon bearing surface on the outer periphery is mounted for free rotation, this outer surface by reason of its larger diameter will move at a faster lineal rate than the inner surface. Hence higher heats generated by reason of friction in the outer surface are admirably tolerated by the carbon therein without deleteriously affecting the remainder of the bearing including the inner polytetrafluoroethylene surface.

While there have been described above the principles of this invention in connection with specific apparatus, it is to be clearly understood that this description is made only by way of example and not as a limitation to the scope of the invention.

What is claimed is:

1. A low-friction bearing comprising a body of self-supporting, hardened plastic having at least two adjacent laminations of fibrous material securely imbedded therein, one of said laminations having a bearing surface and including fibers arranged in layer form of fluorocarbon resin secured in place by said plastic, portions of said fibers being exposed through said plastic to define said bearing surface, the other of said laminations being a rigid backing for said one lamination and including a mass of adjacent fibers in layer form of carbon secured in place by said plastic, said mass of carbon fibers and plastic together forming said rigid backing which serves as a support for said one lamination, said carbon fibers being adjacent to said layer of fluorocarbon resin thereby providing thermal conductivity between fibrous layers.

2. The bearing of claim 1 in which said body is cylindrically shaped having inner and outer peripheral surfaces, said fluorocarbon bearing surface defining one of said peripheral surfaces.

3. The bearing of claim 2 in which said fluorocarbon resin fibers are contiguously arranged in directions both parallel and transversely to said bearing surface thereby to form a cylindrical layer of fibers, said carbon fibers encircling contiguously in cylindrical layer form said layer of fluorocarbon fibers, said carbon fibers serving as strength reinforcement and as thermally conductive media in said body.

4. The bearing of claim 1 in which said carbon fibers are exposed through said plastic to define a second bearing surface.

5. The bearing of claim 1 in which said body is cylindrically shaped having inner and outer peripheral bearing surfaces, said carbon fibers serving as reinforcement in said plastic and the other of said bearing surfaces.

6. The bearing of claim 5 in which said fluorocarbon resin fibers are contiguously arranged in directions both parallel and transversely to said first-mentioned bearing surface thereby to form a layer of fibers, said carbon fibers encircling in layer form said layer of fluorocarbon fibers, the diameters of both peripheral surfaces being uniform, respectively, and the thickness of each fibrous layer being substantially uniform throughout the length thereof, said carbon fibers exposed at said second bearing surface having surfaces conforming substantially to the cylindrical shape of the respective peripheral surface whereby substantial carbon surface area is provided for said second bearing surface.

7. The bearing of claim 6 in which said fluorocarbon fiber layer is radially inside said carbon fiber layer.

8. The bearing of claim 7 in which said fluorocarbon fibers are contained in strands of such fibers with a plurality of said strands being braided into a cord, said cords being braided into a seamless cylinder, said cords being contiguous so as to provide a substantially continuous bearing surface of low-friction fibers.

9. The bearing of claim 8 in which said carbon fiber layer is in the form of a helical wrapping of a carbon tow and said plastic is either polyester or epoxy.

10. The bearing of claim 8 in which carbon fibers are contained in said strands along with said fluorocarbon fibers with portions of said carbon fibers being exposed whereby said bearing surface includes both carbon and fluorocarbon fibrous material, said carbon fiber content contributing mechanical strength to the fluorocarbon composite, serving as a medium for conducting away heat, and providing additional lubricity in the bearing surface.

11. The bearing of claim 10 in which said fluorocarbon is polytetrafluoroethylene.

* * * * *